United States Patent
Kosaraju et al.

(10) Patent No.: US 10,346,376 B2
(45) Date of Patent: Jul. 9, 2019

(54) SYSTEMS AND METHODS FOR DATABASE MANAGEMENT

(71) Applicant: MasterCard International Incorporated, Purchase, NY (US)

(72) Inventors: Srinivas Kosaraju, Wildwood, MO (US); Hima Bindu Nagisetty, Lake St. Louis, MO (US); Jeffery David Hiatt, O'Fallon, MO (US); Joshua A. Allbright, Valley Park, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 339 days.

(21) Appl. No.: 15/341,636

(22) Filed: Nov. 2, 2016

(65) Prior Publication Data
US 2018/0121473 A1 May 3, 2018

(51) Int. Cl.
*G06F 16/21* (2019.01)
*G06F 16/2453* (2019.01)

(52) U.S. Cl.
CPC ........ *G06F 16/217* (2019.01); *G06F 16/2453* (2019.01)

(58) Field of Classification Search
CPC .......................... G06F 16/2453; G06F 16/217
USPC ................................................. 707/692, 769
See application file for complete search history.

(56) References Cited

U.S. PATENT DOCUMENTS

| | | | | |
|---|---|---|---|---|
| 9,009,850 | B2* | 4/2015 | Vedabrata | G06F 21/552 726/28 |
| 2005/0149584 | A1* | 7/2005 | Bourbonnais | G06F 16/256 707/E17.005 |
| 2006/0006222 | A1* | 1/2006 | Brey | G06Q 10/08 235/379 |
| 2008/0250057 | A1 | 10/2008 | Rothstein et al. | |
| 2009/0210445 | A1 | 8/2009 | Draese et al. | |
| 2011/0029514 | A1* | 2/2011 | Kerschberg | G06F 16/3326 707/732 |
| 2013/0347127 | A1* | 12/2013 | Vedabrata | G06F 21/552 726/28 |
| 2014/0089257 | A1* | 3/2014 | Ignacio | G06F 16/214 707/609 |
| 2015/0019528 | A1 | 1/2015 | Vijayan | |
| 2016/0342633 | A1* | 11/2016 | Senthilnathan | G06F 16/22 |

* cited by examiner

*Primary Examiner* — Phong H Nguyen
(74) *Attorney, Agent, or Firm* — Armstrong Teasdale LLP

(57) ABSTRACT

A database management (DM) computing device for reducing an amount of data stored within an enhanced database while ensuring that data remaining within the enhanced database is able to satisfy a plurality of user queries is described. The DM computing device is in communication with the enhanced database and a secondary storage database. The DM computing device is configured to receive a log data file identifying a number of times each data field in the enhanced database has been queried, rank the data fields based on the number of times each data field has been queried, and identify least-queried data fields from the ranked data fields, wherein the least-queried data fields are defined by rules in a memory. The DM computing device is also configured to store in the secondary storage database the least-queried data fields from the enhanced database, and remove from the enhanced database the least-queried data fields.

11 Claims, 3 Drawing Sheets

| | | |
|---|---|---|
| 176018 | process_date | 310 |
| 123355 | sequence_nbr | |
| 42842 | acq_pref_net_txn_amt | |
| 37293 | merch_country_cd | |
| 33661 | iss_pref_net_txn_amt | |
| 32905 | de13_local_txn_date | |
| 16027 | card_num | |
| 15751 | de90s1_mti_cd | 302 |
| 15526 | de60_advice_reason_cd | |
| 15252 | iss_pref_curr_cd | |
| 14492 | acq_pref_curr_cd | |
| 12532 | issuer_id | 312 |
| 7128 | iso_response_cd | 315 |
| 7008 | de18_merch_category_cd | 314 |
| 6896 | net_txn_amt | |
| 5669 | de22s2_pos_term_pin_entry_mode_cd | |
| 3729 | iso_process_cd | |
| 3298 | cardholder_iss_id | 302 |
| 2506 | acq_country_cd | |
| 1411 | cut_iss_ica | |
| 695 | product_cd | |
| 100 | iss_country_cd | |
| 28 | location_id | |

FIG. 3

SYSTEMS AND METHODS FOR DATABASE MANAGEMENT

BACKGROUND

The field of the disclosure relates generally to database management and, more particularly, to methods and systems for improving performance of a database by reducing an amount of data stored within the database while ensuring that data remaining within the database is still able to satisfy a plurality of user queries.

At least some known databases include one or more database tables that include a large number of searchable data fields. User queries may be submitted to a database that enable a user to filter, sort, and search for particular data fields within the database. As the database receives additional data, the performance of the database may be reduced. For example, the database may respond to user queries with an increased delay. The database may require additional storage devices (e.g., hard disk drives) to store the additional data, which may be susceptible to failure or damage. The additional storage devices may also increase the cost of the database for a database provider.

Despite the additional cost and the potentially reduced performance, at least some of the data fields may not be queried or may not be queried frequently during a plurality of user queries. Oftentimes, a plurality of user queries can be satisfied by just a small percentage of the data fields. Therefore, systems and methods are needed to reduce an amount of data stored within the database while ensuring that the data stored within the database is still able to satisfy a plurality of user queries.

BRIEF DESCRIPTION OF THE DISCLOSURE

In one aspect, a database management (DM) computing device for reducing an amount of data stored within an enhanced database while ensuring that data remaining within the enhanced database is able to satisfy a plurality of user queries is provided. The DM computing device includes one or more processors in communication with a memory and is in communication with the enhanced database and a secondary storage database. The DM computing device is configured to receive a log data file identifying a number of times each data field in the enhanced database has been queried, rank the data fields based on the number of times each data field has been queried, and identify least-queried data fields from the ranked data fields, wherein the least-queried data fields are defined by rules stored in the memory. The DM computing device is further configured to store in the secondary storage database the least-queried data fields from the enhanced database, and remove from the enhanced database the least-queried data fields.

In another aspect, a computer-implemented method for reducing an amount of data stored within an enhanced database while ensuring that data remaining within the enhanced database is able to satisfy a plurality of user queries is provided. The method is implemented using a DM computing device in communication with the enhanced database and a secondary storage database. The method includes receiving a log data file identifying a number of times each data field in the enhanced database has been queried, ranking the data fields based on the number of times each data field has been queried, and identifying least-queried data fields from the ranked data fields, wherein the least-queried data fields are defined by rules stored in the memory. The method also includes storing in the secondary storage database the least-queried data fields from the enhanced database, and removing from the enhanced database the least-queried data fields.

In yet another aspect, a non-transitory computer-readable storage media having computer-executable instructions embodied thereon is provided. When executed by at least one processor, the computer-executable instructions cause the at least one processor to receive a log data file identifying a number of times each data field in an enhanced database has been queried, rank the data fields based on the number of times each data field has been queried, and identify least-queried data fields from the ranked data fields, wherein the least-queried data fields are defined by rules stored in a memory. The computer-executable instructions further cause the at least one processor to store in a secondary storage database the least-queried data fields from the enhanced database, and remove from the enhanced database the least-queried data fields.

BRIEF DESCRIPTION OF THE DRAWINGS

FIGS. 1-3 show exemplary embodiments of the device and method described herein.

FIG. 1 illustrates an exemplary configuration of a data management (DM) computing device in accordance with an example embodiment of the present disclosure.

FIG. 2 illustrates a flow diagram showing an example method for reducing a number of data fields stored within an enhanced database using the DM computing device shown in FIG. 1.

FIG. 3 illustrates an example list of data fields generated by the DM computing device shown in FIG. 1, where the list of data fields is ranked by the number of user queries submitted to a database for each data field in accordance with an exemplary embodiment of the present disclosure.

DETAILED DESCRIPTION

Figure 1:
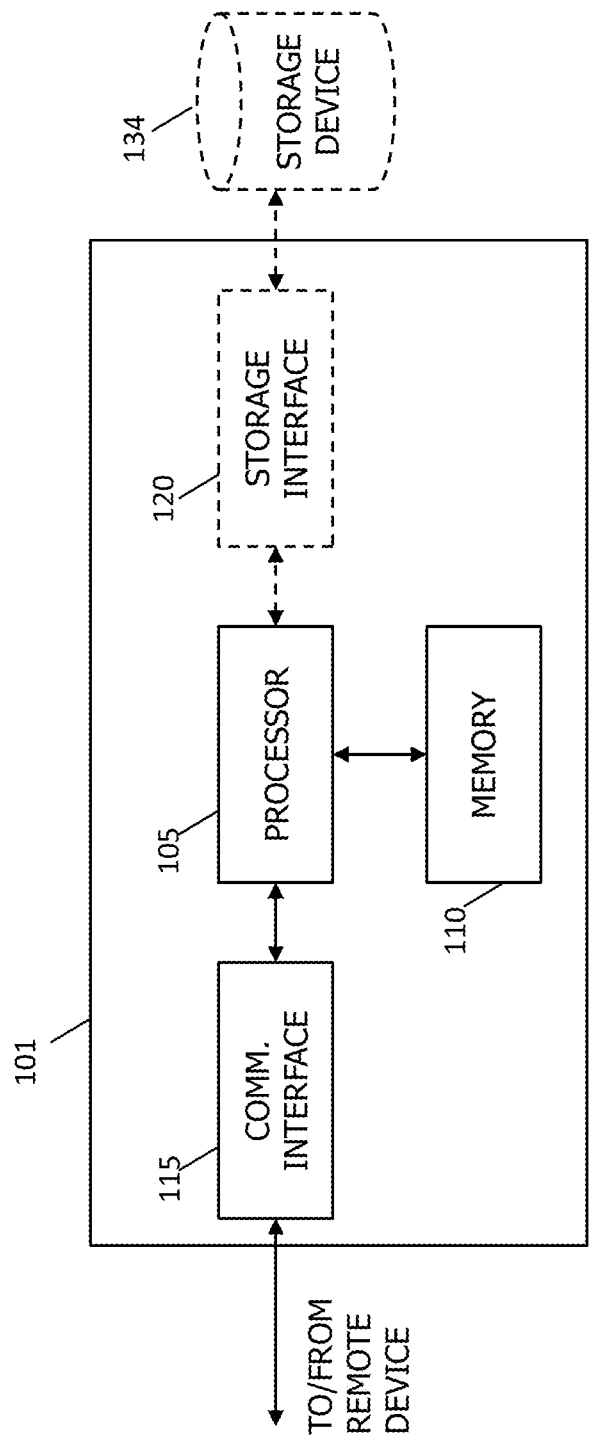

The systems and methods described herein relate generally to reducing a number of data fields stored within an enhanced database while ensuring that the remaining data fields within the enhanced database are still able to satisfy a plurality of user queries. The methods and systems include a database management (DM) computing device including a processor coupled to the enhanced database and an external storage system. As described in detail below, the DM computing device is configured to identify data fields in the enhanced database that have been the least queried over a predefined period of time (known as the "least-queried data fields"). The DM computing device is configured to then store the least-queried data fields from the enhanced database in the external storage system. The DM computing device is further configured to remove the least-queried data fields from the enhanced database to free up additional space for additional data and/or bandwidth for future user queries. If the enhanced database receives a user query identifying a data field that is not included within the enhanced database, the DM computing device is configured to automatically push the user query to the external storage system to find a matching entry, or set of matching entries. Thus, the DM computing device is able to identify the least-queried data fields that are initially stored within the enhanced database, and then move those least-queried data fields from the enhanced database to the external storage system such that the more frequently run queries that only utilize data stored within the enhanced database are responded to more quickly due to overall system improvements, and queries that require data from the least-queried data fields are still responded to by the system. The DM computing device therefore improves the overall efficiency of providing responses to such database queries.

The enhanced database includes one or more data tables. Each table contains records that are entered into the database. Within each record are data fields. Data fields are individual parts that contain information about the record. For example, in a data table including customer information, each customer listed is a record. For each record, there are one or more data fields that include pertinent information about that customer (i.e., customer ID, name, address, phone number, etc.).

As used herein, "data field" refers to a set of data stored across any number of data records. In a database modeled using tables, "data field" may refer to the set of values contained in a column of data. Additionally or alternatively, "data field" may refer to properties of a set of data (i.e., column), such as a data type (e.g., integer, decimal) and/or an identifying name (e.g., "CardNumber").

Initially, the DM computing device receives a log data file from a memory device, such as the enhanced database, the external storage system, or a separate memory device coupled to the DM computing device. The log data file identifies a number of times each data field within the enhanced database has been queried in a predefined time period (e.g., the previous 7 years). The DM computing device is configured to generate a list (as shown in FIG. 3) ranking the data fields by the number of user queries submitted to the enhanced database for each data field. In other words, the data fields are sorted into an order based on the number of user queries for each data field.

In some embodiments, the DM computing device may be configured to rank data fields based on factors in addition to the number of user queries submitted for each data field. In one embodiment, the DM computing device may be configured to rank data fields based on user queries submitted and data storage size. For example, a data field storing high resolution images may have the same number of user queries as a data field storing ten digit phone numbers. The DM computing device may sort the data field containing phone numbers to a higher position than the data field containing images.

Once the data fields are sorted, the DM computing device is configured to identify data fields in the enhanced database that have been least queried over the predefined time period (i.e., the least-queried data fields). In the example embodiment, the least-queried data fields are defined as data fields that are the least queried by users pursuant to a predefined threshold (e.g., a predefined percentage of the least queried data fields). For example, the least-queried data fields are data fields within the $80^{th}$ percentile of data fields receiving the least number of user queries submitted to the enhanced database. In an alternative embodiment, the DM computing device is configured to identify the data fields in the enhanced database that have been most queried over a predefined period of time (e.g., the top 20% of data fields with the most user queries), while the remaining data fields constitute the least-queried data fields. In another embodiment, the least-queried data fields are defined as data fields that have not been queried at least a predetermined number of times. In still another embodiment, the data log file includes for each data field a number of users that queried the data field, and the least-queried data fields are defined as data fields that have not been queried by at least a predetermined number of users.

The DM computing device is configured to store the least-queried data fields in the enhanced database in an external storage system. The external storage system is configured to store large volumes of data. In the example embodiment, the external storage system is typically a slower, more cost-efficient data warehouse platform, for example, an open-source and/or distributed storage/processing data warehouse platform, such as Hadoop® (Hadoop® is a registered trademark of The Apache Software Foundation Corporation).

Once the least-queried data fields are copied to the external storage system, the DM computing device is configured to delete the least-queried data fields from the enhanced database, thereby reducing the number of data fields in the one or more database tables and freeing up the storage space required for the least-queried data fields in the enhanced database. Accordingly, an amount of data fields scanned during response to a user query is reduced, thereby improving a query runtime and an overall system performance. In addition, since data size of the total data stored in the enhanced database is reduced, a number of partitions needed are also reduced, further speeding up the query runtime. As used herein, "partitions" indicate when a set of related data (i.e., a table or data field) is stored in a non-contiguous format. For example, a table may be partitioned when the data stored in the table exceeds the capacity of the current storage medium (e.g., a hard disk drive) within the database.

The data fields remaining in the enhanced database are typically sufficient to satisfy a plurality of user queries submitted to the enhanced database. In additional embodiments, the enhanced database may be configured to use higher performance storage devices (e.g., solid state drives) and storage schemes that may not have been cost-effective to store all of the data fields. In some embodiments, the enhanced database is a faster, more expensive data warehouse platform configured to handle large queries, such as Netezza® (Netezza® is a registered trademark of Netezza Corporation, an IBM Company) or Exadata® (Exadata® is a registered trademark of Oracle International Corporation). Such enhanced databases may include compute servers, storage server, networking features, parallel processing capability (e.g., in a two-tiered system architecture), and/or specialized software (or the capability to execute such software), for example, in a "racked" configuration, and may provide cloud computing and/or storage capability. Enhanced databases may include transactional databases or relational databases. The reduced data size and improved storage devices enable the enhanced database to increase performance while satisfying a plurality of user queries.

If the enhanced database receives a user query identifying a data field that is not stored within the enhanced database (i.e., a data field that is a least-queried data field), the DM computing device is configured to push the user query to the external storage system. The DM computing device then searches a database within the external storage system for a matching entry. In one embodiment, if the DM computing device receives a user query identifying at least one least-queried data field (i.e., a user query that requires at least one least-queried data field to generate a response to the query) and at least one data field stored in the enhanced database, the DM computing device is configured to push the user query to the external storage system for handling. In another embodiment, the DM computing device is configured to split the user query into at least two "sub-queries." For example, a first sub-query is directed to any and all data fields stored in the enhanced database, and the DM computing device submits the first sub-query to the enhanced database for processing. A second sub-query is directed to any and all least-queried data fields stored in the external storage system. The DM computing device pushes the second sub-query to the external storage system for processing. The DM computing device may append an identifier to each sub-query, the identifier linking the sub-queries and associated each sub-query to the initial user query.

In some instances, the DM computing device may return the response to the first sub-query to the user that originated the user query substantially immediately after the response is available. The DM computing device may return the response to the second sub-query to the user that originated the user query substantially immediately after the response is available, which may be an amount of time after the response to the first sub-query is returned (e.g., hours or days). Accordingly, in other instances, the DM computing device may temporarily store the response to the first sub-query (e.g., in another memory device in communication with the DM computing device) until the response to the second sub-query is available, and may join the responses into a single, unified response to return to the user.

In one embodiment, if multiple user queries are made involving both the enhanced database and the external storage system, the DM computing device is configured to link together matching entries from the enhanced database and the external storage system.

The methods and systems described herein may be implemented using computer programming or engineering techniques including computer software, firmware, hardware or any combination or subset thereof, wherein the technical effects may be achieved by performing one of the following steps: (a) receiving, by a DM computing device, log data file that includes a number of user queries for each data field for a predefined time period; (b) ranking or sorting, by the DM computing device, the data fields based on the number of user queries submitted to an enhance database for each data field; (c) identifying, by the DM computing device, least-queried data fields; (d) storing, by the DM computing device, the least-queried data fields from the enhanced database to an external storage system; and (e) deleting, by the DM computing device, the least-queried data fields from the enhanced database.

The technical benefits achieved by the methods and systems described herein include: (a) reducing storage space required by the least-queried data fields in the enhanced database; (b) reducing a number of data fields scanned during a user query, thereby improving query runtime and bandwidth; (c) reducing an amount of data scanned during a user query, thereby improving query runtime and bandwidth; (d) improving an overall system performance; (e) reducing a number of partitions, further improving the query runtime; (f) increasing bandwidth of a network; and (g) increasing a speed and an efficiency of the network.

Further, any processor in a computer device referred to herein may also refer to one or more processors wherein the processor(s) may be in one DM computing device or a plurality of DM computing devices acting in parallel. Additionally, any memory in a computer device referred to herein may also refer to one or more memories wherein the memories may be in one DM computing device or a plurality of DM computing devices acting in parallel.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database," "enhanced database, and/or "external storage system" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer readable medium. In an exemplary embodiment, the system is executed on a single computer system, without requiring a connection to a sever computer. In a further exemplary embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The system is flexible and designed to run in various different environments without compromising any major functionality. In some embodiments, the system includes multiple components distributed among a plurality of DM computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the invention by way of example and not by way of limitation. It is contemplated that the invention has general application to database management in a variety of applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present invention are not intended to be interpreted as excluding the existence of additional embodiments that also incorporate the recited features.

FIG. 1 illustrates an exemplary configuration of a DM (data management) computing device 101. DM computing device 101 includes a processor 105 for executing instructions. Instructions may be stored in a memory area 110, for example. Processor 105 may include one or more processing units (e.g., in a multi-core configuration) for executing instructions. The instructions may be executed within a variety of different operating systems on DM computing device 101, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 105 is operatively coupled to a communication interface 115 such that DM computing device 101 is capable of communicating with a remote device. For example, communication interface 115 may receive a log data file from a memory device (i.e., the enhanced database, the external storage system, or a separate memory device coupled to DM computing device 101).

Processor 105 may also be operatively coupled to a storage device 134 (i.e., the enhanced database and/or the external storage system described above). Storage device 134 is any computer-operated hardware suitable for storing and/or retrieving data. In some embodiments, storage device 134 is integrated in DM computing device 101. For example, DM computing device 101 may include one or more hard disk drives as storage device 134. In other embodiments, storage device 134 is external to DM computing device 101 and may be accessed by a plurality of DM computing devices 101. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 105 is operatively coupled to storage device 134 via a storage interface 120. Storage interface 120 is any component capable of providing processor 105 with access to storage device 134. Storage interface 120 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 105 with access to storage device 134.

Memory area 110 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 2:
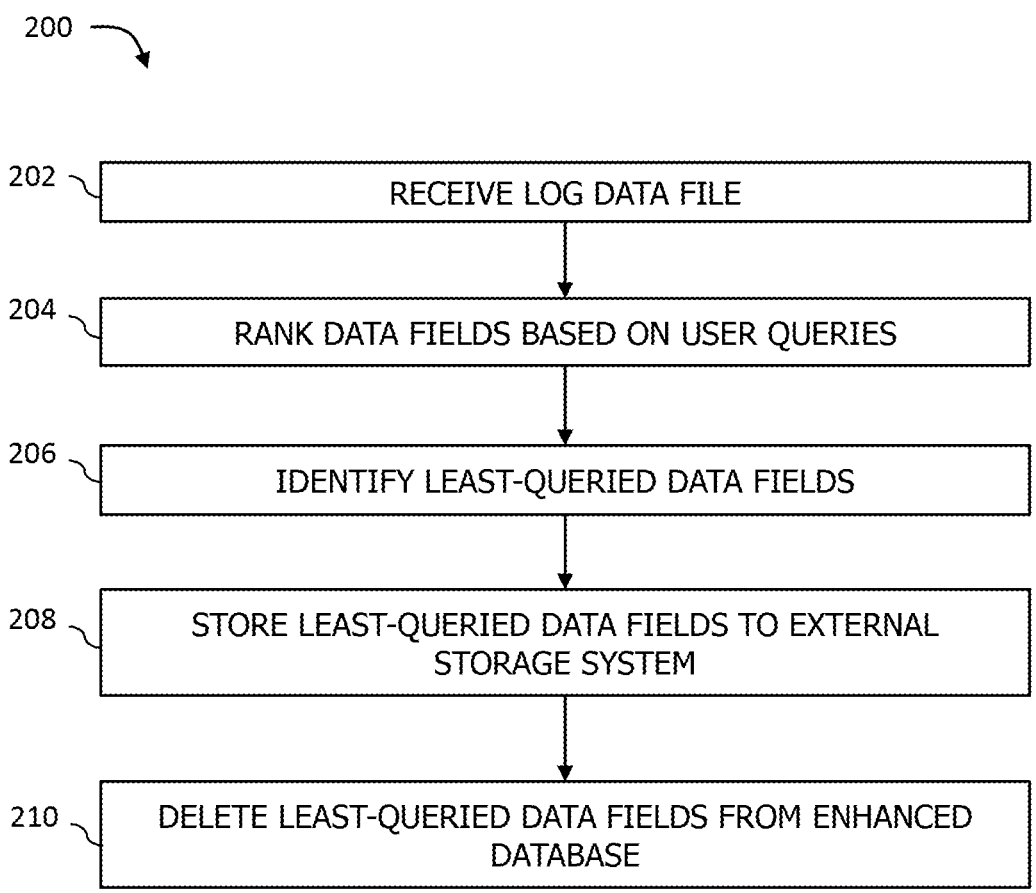

FIG. 2 is a flow diagram 200 showing a method for reducing a number of data fields stored within an enhanced database while ensuring that data fields remaining within the enhanced database are still able to satisfy a plurality of user queries. The method is performed, in one embodiment, using DM computing device 101 (shown in FIG. 1).

The DM computing device is configured to receive 202 a log data file for a predefined time period from a memory device. The log data file identifies a number of times each data field in the enhanced database has been queried. The DM computing device is further configured to rank 204 the data fields based on user queries for each data field, as shown in FIG. 3. The DM computing device is configured to identify 206 least-queried data fields as described above.

The DM computing device is further configured to store 208 the least-queried data fields in the enhanced database to the external storage system. The DM computing device is further configured to delete 210 the least-queried data fields from the enhanced database to improve query runtime and free-up additional space and bandwidth for additional data and/or future queries.

FIG. 3 illustrates an exemplary list 300 of data fields 302 generated by the DM computing device using a log data file. List 300 is ranked/sorted by a number of user queries 304 submitted to an enhanced database for each data field 302. List 300 includes at least two columns including a first column 306 and a second column 308. First column 306 is the number of user queries 304 for an associated data field 302. Second column 308 includes data fields 302. In one embodiment, the DM computing device is configured to rank/sort data fields 302 from highest to lowest based on the number of user queries 304 submitted to the enhanced database for each data field 302.

In one embodiment, The DM computing device is configured to generate list 300 based upon a log data file that identifies a number of times each data field within the enhanced database has been queried in a predefined time period. In other words, the log data file may be an unsorted version of list 300. The log data file identifies the number of user queries 304 submitted to the enhanced database for each data field 302. In another embodiment, the DM Computing device may be configured to generate list 300 based upon a log file that identifies individual queries to data fields within the enhanced database performed within a predefined time period. In this embodiment, the DM computing device may be further configured to aggregate the log file to determine the total number of queries to each data field. List 300 may be a new file created by the DM computing device or a ranking/sorting of the data fields within the log data file. For example, there are more user queries 304 for a process date (i.e., "process_date" 310) than user queries 304 for an issuer ID (i.e., "issuer_id" 312). Therefore, DM computing device ranks the process date data field higher than the issuer ID data field.

The DM computing device is configured to create list 300 to identify the least-queried data fields. For example, in one embodiment, the DM computing device may be configured to determine that data fields with less than 7,000 user queries are least-queried data fields (i.e., data field 314 and below). The DM computing device copies the least-queried data fields (i.e., data field 314 and below) from the enhanced database to an external storage system. The DM computing device then deletes the least-queried data fields (i.e., data field 314 and below) from the enhanced database. The enhanced database then includes the remaining data fields (i.e., data field 315 and above) to satisfy a plurality of user queries.

The above-described embodiments of methods and systems for reducing a number of data fields stored within a database while still ensuring that the data remaining within the database is able to satisfy a plurality of user queries. As a result, the methods and systems described herein increases the performance of the enhanced database.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are exemplary only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect is receiving log data file that includes a number of user queries for each data field for a predefined time period, ranking or sorting the data fields based on the number of user queries submitted to an enhanced database for each data field, identifying least-queried data fields, storing the least-queried data fields in the enhanced database to an external storage system, and deleting the least-queried data fields from the enhanced database. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A database management (DM) computing device for reducing an amount of data stored within an enhanced database while ensuring that data remaining within the enhanced database is able to satisfy a plurality of user queries, the DM computing device comprising one or more processors in communication with a memory, the DM computing device being in communication with the enhanced database and a secondary storage database, the DM computing device configured to:
   receive a log data file identifying a number of times each data field in the enhanced database has been queried;
   rank the data fields based on the number of times each data field has been queried;
   identify least-queried data fields from the ranked data fields, wherein the least-queried data fields are defined by rules stored in the memory;
   store in the secondary storage database the least-queried data fields from the enhanced database;
   remove from the enhanced database the least-queried data fields;
   execute at least one query on the enhanced database;
   identify that the at least one query requires data stored within both the enhanced database and the secondary storage database for responding thereto;
   identify the least-queried data fields required to generate a response to the at least one query;
   generate a first sub-query directed to the least-queried data fields;
   automatically execute the first sub-query on the secondary storage database;
   generate a second sub-query directed to any remaining data fields;
   automatically execute the second sub-query on the enhanced database; and
   provide a response to the at least one query that includes data stored within both the enhanced database and the secondary storage database.

2. The DM computing device of claim 1, wherein the DM computing device is further configured to:
   execute at least one second query on the enhanced database;
   identify that the at least one second query requires at least one least-queried data field for generating a response to the at least one query; and
   automatically execute the at least one second query on the secondary storage database.

3. The DM computing device of claim 1, wherein the enhanced database includes a database system configured to handle large queries using parallel processing architecture.

4. The DM computing device of claim 1, wherein the secondary storage database includes a distributed storage and distributed processing database framework.

5. The DM computing device of claim 1, wherein the rules define the least-queried data fields as at least one of (i) a predefined percentage of the least queried data fields, (ii) data fields that have not been queried for at least a predetermined number of times, and (iii) data fields that have not been queried by at least a predetermined number of users.

6. A computer-implemented method for reducing an amount of data stored within an enhanced database while ensuring that data remaining within the enhanced database is able to satisfy a plurality of user queries, the method implemented with a database management (DM) computing device in communication with the enhanced database and a secondary storage database, said method comprising:
   receiving a log data file identifying a number of times each data field in the enhanced database has been queried;
   ranking the data fields based on the number of times each data field has been queried;
   identifying least-queried data fields from the ranked data fields, wherein the least-queried data fields are defined by rules stored in the memory;
   storing in the secondary storage database the least-queried data fields from the enhanced database;
   removing from the enhanced database the least-queried data fields;
   executing at least one query on the enhanced database;
   identifying that the at least one query requires data stored within both the enhanced database and the secondary storage database for responding thereto;
   identifying the least-queried data fields required to generate a response to the at least one query;
   generating a first sub-query directed to the least-queried data fields;
   automatically executing the first sub-query on the secondary storage database;

generating a second sub-query directed to any remaining data fields;
automatically executing the second sub-query on the enhanced database; and
providing a response to the at least one query that includes data stored within both the enhanced database and the secondary storage database.

7. The method of claim 6 further comprising:
executing at least one second query on the enhanced database;
identifying that the at least one second query requires at least one least-queried data field for generating a response to the at least one query; and
automatically executing the at least one second query on the secondary storage database.

8. The method of claim 6 further comprising storing the rules in the memory, wherein the rules define the least-queried data fields as at least one of (i) a predefined percentage of the least queried data fields, (ii) data fields that have not been queried for at least a predetermined number of times, and (iii) data fields that have not been queried by at least a predetermined number of users.

9. A non-transitory computer-readable storage media having computer-executable instructions embodied thereon, when executed by at least one processor, the computer-executable instructions cause the at least one processor to:
receive a log data file identifying a number of times each data field in an enhanced database has been queried;
rank the data fields based on the number of times each data field has been queried;
identify least-queried data fields from the ranked data fields, wherein the least-queried data fields are defined by rules stored in a memory;
store in a secondary storage database the least-queried data fields from the enhanced database;
remove from the enhanced database the least-queried data fields;
execute at least one query on the enhanced database;
identify that the at least one query requires data stored within both the enhanced database and the secondary storage database for responding thereto;
identify the least-queried data fields required to generate a response to the at least one query;
generate a first sub-query directed to the least-queried data fields;
automatically execute the first sub-query on the secondary storage database;
generate a second sub-query directed to any remaining data fields;
automatically execute the second sub-query on the enhanced database; and
provide a response to the at least one query that includes data stored within both the enhanced database and the secondary storage database.

10. The non-transitory computer-readable storage media of claim 9, wherein the computer-executable instructions further cause the at least one processor to:
execute at least one second query on the enhanced database;
identify that the at least one second query requires at least one least-queried data field for generating a response to the at least one query; and
automatically execute the at least one second query on the secondary storage database.

11. The non-transitory computer-readable storage media of claim 9, wherein the rules define the least-queried data fields as at least one of (i) a predefined percentage of the least queried data fields, (ii) data fields that have not been queried for at least a predetermined number of times, and (iii) data fields that have not been queried by at least a predetermined number of users.

* * * * *